UNITED STATES PATENT OFFICE.

MEINHARD HOFFMANN, OF MAINKUR, NEAR FRANKFORT-ON-THE-MAIN, ASSIGNOR TO LEOPOLD CASSELLA & CO., OF FRANKFORT-ON-THE-MAIN, GERMANY.

COLORING-MATTER FROM BETA-NAPHTHOL.

SPECIFICATION forming part of Letters Patent No. 314,938, dated March 31, 1885.

Application filed February 7, 1884. (No specimens.)

*To all whom it may concern:*

Be it known that I, MEINHARD HOFFMANN, doctor of philosophy, a subject of the Emperor of Germany, residing at Mainkur, near Frankfort-on-the-Main, Germany, have invented new and useful Improvements in the Manufacture of new Coloring-Matters, of which the following is a specification.

My invention relates to a new dye-stuff which results from the reaction of the diazo compound of the difficultly soluble alphanaphthylamine monosulphonic acid with the gamma disulphonic acid of beta-naphthol in alkaline solution.

The preparation and properties of my new gamma disulphonic acid of beta-naphthol I have described in my application for a patent dated this day.

In order to produce a red coloring-matter with the acid of the gamma disulphonic acid of beta-naphthol, I first mix 22.3 parts of the difficultly-soluble alphanaphthylamine sulphonic acid with twenty-five parts of hydrochloric acid (containing thirty-three per cent. HCl) and two hundred and fifty parts of water. By then treating the paste thus obtained with 6.9 parts of nitrite of sodium I convert the alphanaphthylamine sulphonic acid into its diazo compound. I then prepare a solution of thirty-eight parts of the beta-naphthol gamma disulphonate of potassium in two hundred and fifty parts of water and add to it twenty parts of aqueous ammonia, at twenty-five per cent. ($NH_3$,) and now I allow the diazo compound of the alphanaphthylamine sulphonic acid produced in the above-described manner to flow slowly into this solution.

The new dye-stuff separates, by addition of a concentrated solution of common salt, in the form of a crystallized precipitate, which is easily purified by recrystallization from water.

What I claim as new, and desire to secure by Letters Patent, is—

1. The described process for producing a red coloring-matter, which consists in mixing the diazo compound of the difficultly soluble alphanaphthylamine sulphonic acid with an alkaline solution of beta-naphthol gamma disulphonic acid.

2. As a new product of the process herein described, a red coloring-matter producing on wool and silk a blue shade of color, as described.

In testimony whereof I have signed my name to this specification in the presence of two subscribing witnesses.

MEINHARD HOFFMANN.

Witnesses:
 FRANK WIRTH,
 FRANZ HASSLACHER.